March 10, 1959     L. L. FOWLER     2,876,904
COMBINED GRAVITY SEPARATOR AND FILTER
Filed Feb. 23, 1955     3 Sheets-Sheet 1

INVENTOR
Leslie L. Fowler
By Carlson, Pitzner, Hubbard & Wolfe
ATTORNEY

March 10, 1959 L. L. FOWLER 2,876,904
COMBINED GRAVITY SEPARATOR AND FILTER
Filed Feb. 23, 1955 3 Sheets-Sheet 2
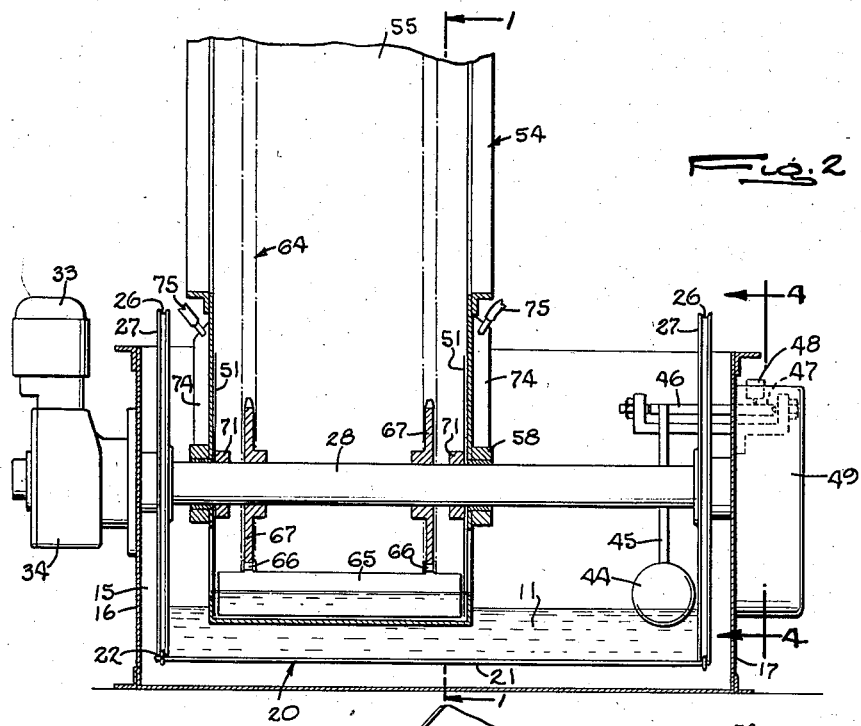
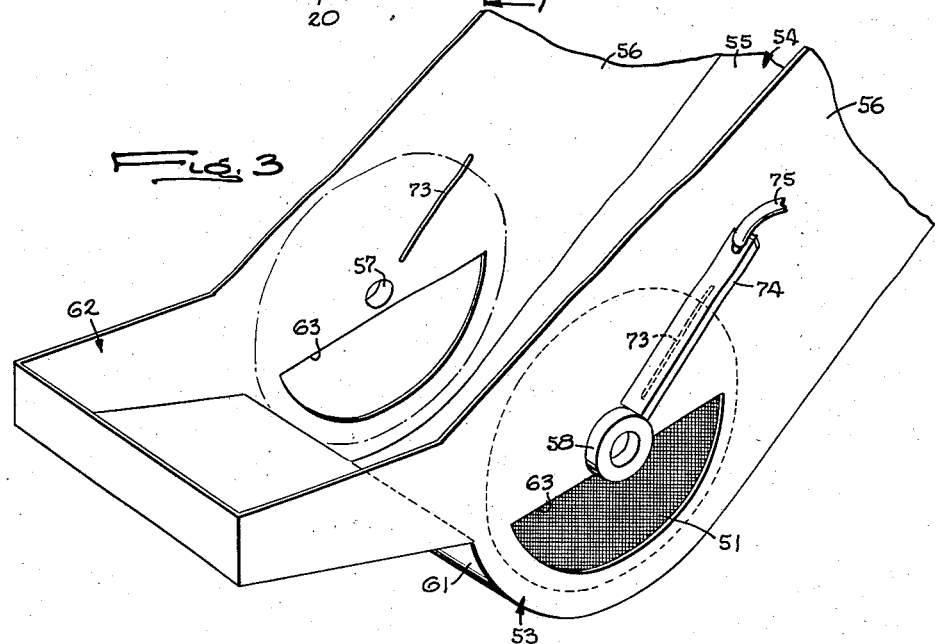
INVENTOR
Leslie L. Fowler
By Carlson, Pitzner, Hubbard & Wolfe
ATTORNEY

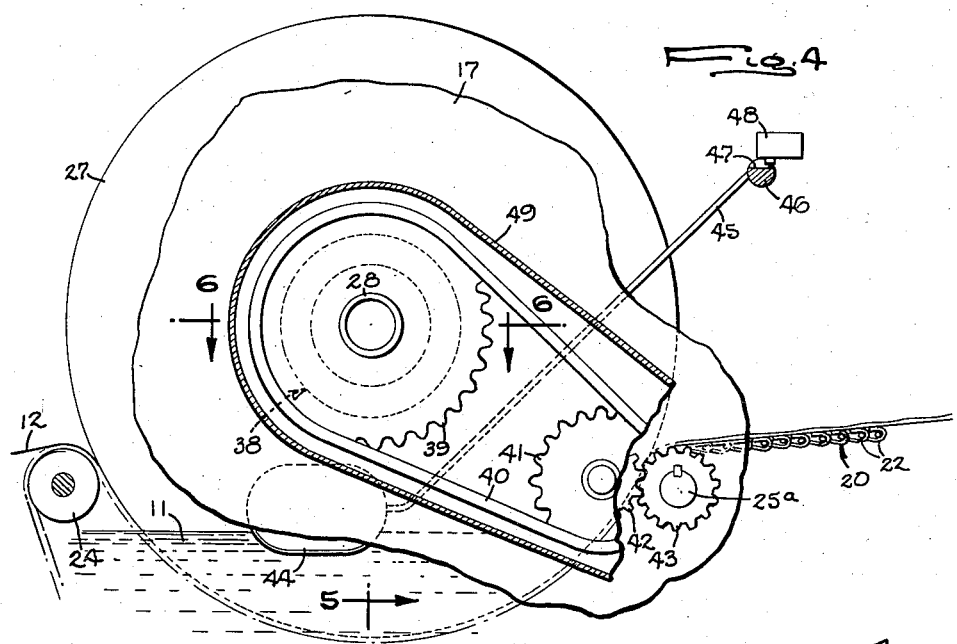
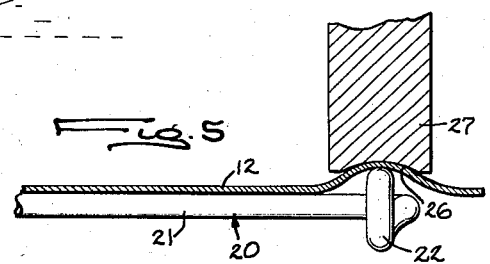
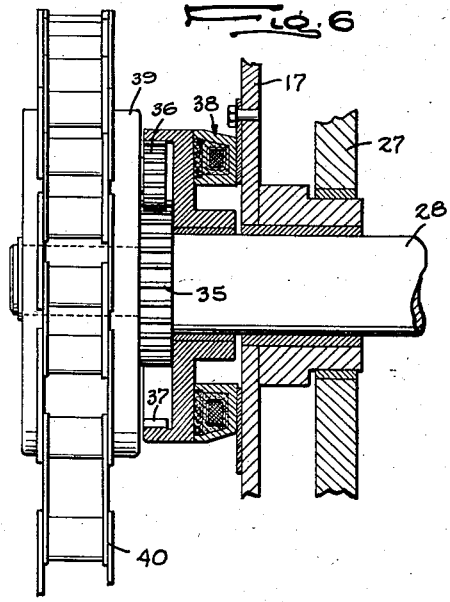
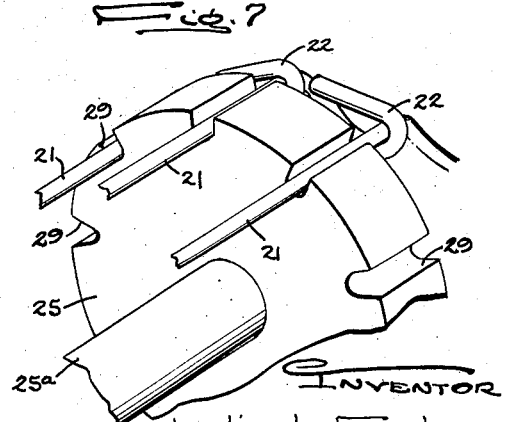

United States Patent Office 2,876,904
Patented Mar. 10, 1959

2,876,904

COMBINED GRAVITY SEPARATOR AND FILTER

Leslie L. Fowler, Rockford, Ill., assignor to Barnes Drill Co., Rockford, Ill., a corporation of Illinois Application February 23, 1955, Serial No. 489,957

8 Claims. (Cl. 210—298)

This invention relates to the cleaning of liquids by settling or straining actions to separate coarse solids and by a subsequent filtering action to remove fine particles. In certain of its aspects, the invention relates to a traveling medium gravity type filter in which the filter medium is renewed automatically.

The general object is to provide a combined separator of the above character which is simple and inexpensive in construction, which occupies a minimum floor space, which operates automatically without attention over long periods of service use, and which is particularly adapted for the efficient cleaning of liquid such as machine tool coolants.

Another object is to successively remove coarse and fine particles from a liquid by passing the latter first through a separator unit which operates with a settling and straining action and then through an associated filtering unit, both units being renewed automatically in service use.

A further object is to construct and combine the separator and filter in a novel manner not only to promote overall compactness but also to simplify the driving mechanism required.

A more detailed object is to form the filter pool with an arcuate bottom and to arrange the separator unit in a novel and close relationship therewith so that the rotary operating parts of the cleaning mechanism of the two units are disposed on a common axis.

Other objects and advantages of the invention will become apparent from the following detailed description taken in connection with the accompanying drawings, in which:

Fig. 2 is a fragmentary section taken along the line 2—2 of Fig. 1.

Fig. 3 is a fragmentary perspective view of part of the separator unit.

Fig. 4 is a fragmentary sectional view taken along the line 4—4 of Fig. 2 and showing the drive mechanism for the filter medium, certain of the parts being broken away.

Figure 1:
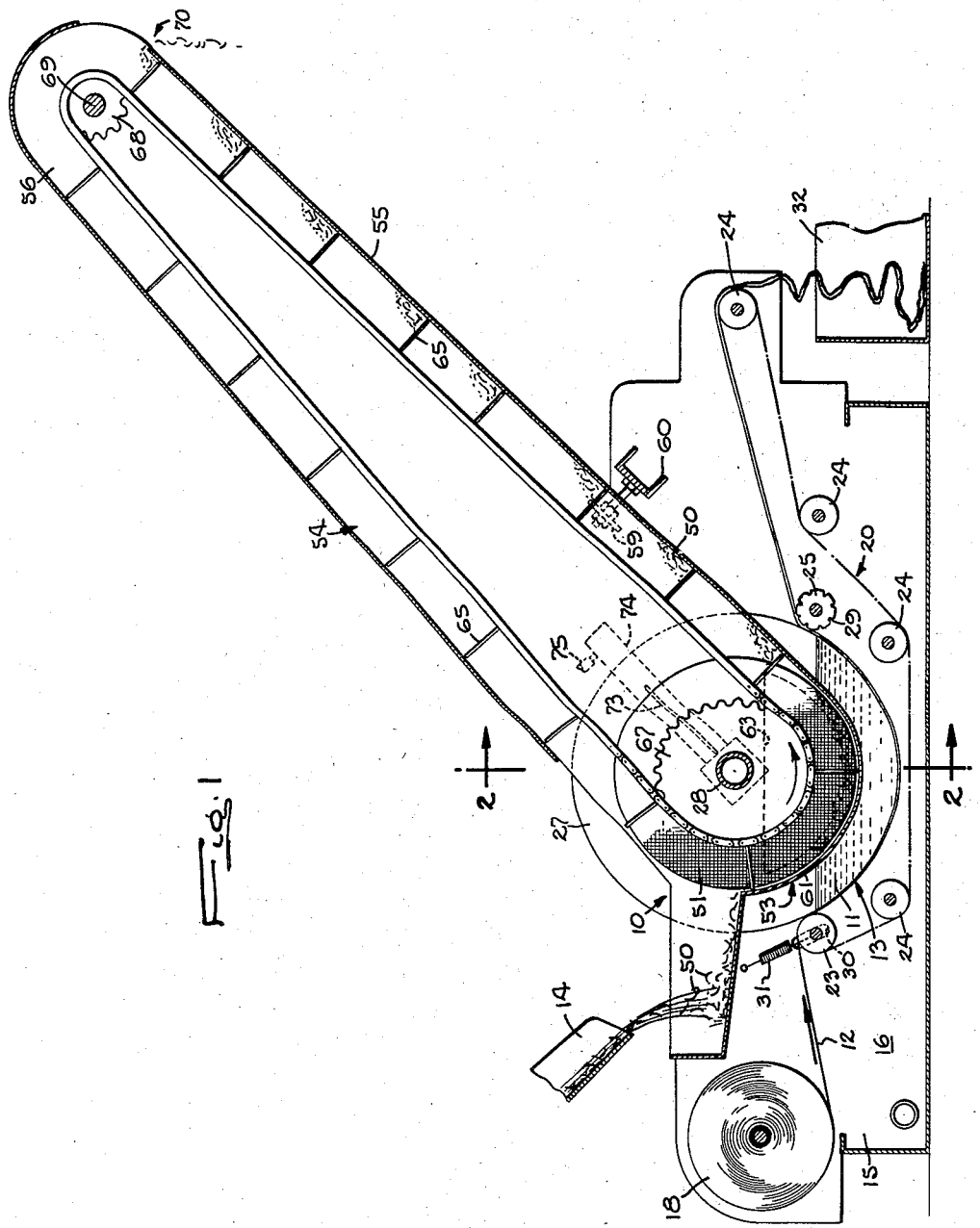
Figure 1 is a vertical sectional view taken substantially along the line 1—1 of Fig. 2 of a combined separator and filter embodying the novel features of the present invention, certain of the parts being shown diagrammatically.

Figs. 5 and 6 are fragmentary sections taken respectively along the lines 5—5 and 6—6 of Fig. 4.

Fig. 7 is a fragmentary perspective view of the conveyor for the filter media.

In the drawings, the invention is shown by way of illustration incorporated in a combined machine comprising an automatically renewable gravitational separator and strainer 10 nested compactly within and immediately above the pool 11 of a traveling sheet 12 which forms a fine mesh filter 13 for removing smaller particles from the liquid passing through the separator unit 10 to which the liquid to be cleaned is delivered through a spout 14. The filtrate gravitating through the sheet 12 is collected in a tank 15 formed by an elongated rectangular box having upstanding side walls 16 and 17 which support all of the movable parts of the separating and filtering units.

To form the filter 13 the sheet 12 which may be non-woven paper-like material is unwound from a removable supply roll 18 and passed longitudinally to form the pool 10. This may be accomplished by supporting the sheet on an endless flexible conveyor 20 comprising parallel wire slats 21 (Figs. 2 and 7) joined at their ends by loops 22 to form an endless belt supported by rollers 23, 24, and 25 having trunnions at opposite ends which are journaled in bearings supported in the tank walls 16 and 17. The conveyor loops 22 form ribs upstanding from the side edges of the conveyor and pressing the margins of the supported filter sheet 12 into grooves 26 in the peripheries of disks 27 which are loose on a power driven shaft 28 journaled at opposite ends in the tank walls 16 and 17.

The conveyor contacts the lower arcuate portions of the disks 27 between the tensioning roll 23 and the drive roll 25 which are disposed close to the disk peripheries on opposite sides of the shaft 28. The drive roll is divided into two relatively short parts formed around their peripheries with notches 29 which receive the slats 21 of the conveyor and thus provide a positive drive for advancing the conveyor and the filter sheet in the direction indicated by the arrow in Fig. 1. To tension the conveyor around the disks and seal the margins of the filter sheet tightly in the grooves 26 the end trunnions of the roll 23 are disposed in slots 30 and urged upwardly by springs 31. Beyond the drive sprockets 25, the used part of the filter sheet is carried by the conveyor upwardly and around the outer idler roll 24 from which it gravitates into a suitable collection receptacle 32. The conveyor then bends reversely and is led back beneath the filter sheet around the lower idler rolls.

It will be apparent that the arcuate portion of the sheet 12 between the rolls 23 and 25 cooperates with the lower segmental portions of the disks 27 to form a pocket for receiving liquid to form the pool 11 which is maintained at a depth sufficient to induce gravitational filtering of the liquid through the active area of the filter sheet and between the slats of the conveyor supporting the same. The filtrate collects in the bottom of the tank and may be drawn off through a suitable outlet.

Power for turning the drive sprockets 25 to advance the carrier and the filter sheet is derived in the present instance from an electric motor 33 (Fig. 2) mounted on the tank wall 16 and operating through a speed reducer 34 to drive the shaft 28 continuously adjacent and outside of the other wall 17. The shaft carries a sun gear 35 of a planetary differential whose planet gear 36 meshes with a ring gear 37 adapted to be locked against turning by energization of a ring magnet 38 secured to the wall 17, the ring gear forming the magnet armature. The planet gear is journaled on a sprocket 39 loose on the shaft 18 and coupled through a chain 40 to a sprocket 41 mounted on the wall 17 and rigid with a gear 42 that meshes with a gear 43 on the shaft 25ª carrying the drive sprockets 25.

The arrangement above described forms a clutch by which the motion of the shaft 28 is transmitted to the ring gear 37 when the latter is free to turn, this being the condition when the magnet is deenergized. Upon energization of the magnet, the ring gear is gripped frictionally and held against turning so that torque derived from the shaft 18 is applied to the spider of the differential thus turning the sprocket 39 and the drive sprockets 25 to advance the filter sheet and the conveyor 20.

Preferably, though not necessarily, advance of the filter sheet 12 to bring fresh portions into the active filtering area occurs intermittently and in response to clogging of the filter sheet as evidenced by a rise in the pool 11. This condition is detected by a float 44 (Figs. 2 and 4) which rides the liquid in the pool and is carried by an arm 45 rigid with a rockshaft 46 journaled on the tank frame. A cam 47 on this shaft engages the actuator of a stationarily mounted switch 48 which, when closed, completes the magnet circuit thus holding the ring gear against turning so as to cause the motion of the drive shaft 28 to be transmitted to the conveyor to advance a new portion of the filter sheet into the filtering area. When the filtering capacity of the sheet has been increased sufficiently to lower the liquid level below the desired point, the switch is opened and the clutch released thereby interrupting the advance of the sheet. The switch and the parts of the drive mechanism are enclosed in a housing 49.

In the present instance, the separator unit 10 for first removing coarse particles such as chips 50 from the liquid operates by gravitational settling and also by straining of the liquid through perforated members or screens 51, the particles thus removed being automatically carried out of the separator to a point of disposal outside of the tank. The receptacle 53 in which the settling takes place is formed by the lower end portion of a chute 54 disposed above the filter 13 and inclined upwardly and outwardly from below the shaft 28. The chute has a flat bottom 55 and upstanding parallel side walls 56 which are apertured at 57 to receive the shaft 28 along which the chute is positioned laterally by collars 58 (Fig. 2). Brackets 59 on the sides of the chute bear against adjustable supports 60 on the tank to support the chute at a point spaced from the shaft. Below the shaft, the bottom of the chute is curved upwardly as indicated at 61 in an arc concentric with the shaft and this curved portion cooperates with the adjacent side walls of the chute to form the receptacle 53 whose outer edge merges with a box-like inlet receptacle 62 into which the liquid to be cleaned is delivered from the spout 14.

The side walls of the strainer receptacle 53 are formed with segmental openings 63 of substantial size with their lower arcuate edges disposed somewhat above the arcuate bottom 61 of the receptacle and the upper chordal edges disposed adjacent the shaft 28. These openings are covered by the screens 51 whose openings are small enough to retain the chips 50 or other particles which do not settle out of the liquid immediately. In the present instance, the lower portion of the receptacle 53 is submerged in the filter pool 11 and the strained liquid passes through the opening 63 at points disposed only slightly above the level at which the pool is normally maintained as above described.

The chips accumulating in the bottom of the receptacle 53 are removed and carried upwardly along the chute bottom by a suitable conveyor 64 which preferably is driven by the shaft 28 and which herein is of the paddle type. It comprises a series of rigid paddles 65 spaced along and projecting outwardly from two chains 66 meshing with sprockets 67 which are fast on the shaft 28 within the chute. At the upper end of the chute, the chains pass around sprockets 68 on a shaft 69 spanning the chute side walls. The paddles are secured rigidly to the chains and are sized to fit loosely within the chute but close to the chute bottom. Thus, during turning of the sprockets 67 in the direction indicated by the arrow in Fig. 1, each paddle, in passing downwardly around the drive sprockets, sweeps along the curved bottom 61 of the receptacle 53 to pick up any chips that have accumulated thereon, such chips then being carried upwardly along the chute bottom and eventually discharged off from the upper end 70 of the latter.

The invention also contemplates the provision of power driven means for cleaning the screens 51 so as to preclude objectionable clogging thereof. To this end, the screens are, in the present instance, relatively rigid and formed as circular disks apertured to receive the shaft 28 and having hubs 71 secured to the latter in positions to dispose the screens close to the side walls 56 of the chute. The screen disks thus rotate with the shaft and different portions of the screens are presented opposite the openings 63 so as to form the straining medium.

The different areas of the screens are cleaned while they are disposed out of the straining area and above the liquid in the receptacle 53. While this may be accomplished in various ways, it is achieved in the present instance by blowing air under pressure through the screen areas in a direction inwardly from the side walls of the chute. To this end, each side wall of the chute is formed with a slot 73 extending radially of the adjacent screen disk and disposed within the circumference of the latter thereby exposing successive radial portions of the screen during its rotation with the shaft 28.

Extending along the exterior of the chute wall and covering the slot 73 therein is a tube 74 which may be an angle bar with its side edges welded to the chute walls and closed at opposite ends. Compressed air from a suitable source of supply is delivered to the tube through a hose 75 so as to provide for a continuous flow of air through the slots 73 and the successive areas of the screen as they are presented opposite the slots. In this way, any particles retained within the perforations of the screen are blown inwardly and out of the screens and after which they fall down into the receptacle 53 for removal by the paddle conveyor along with the material which settles out of the liquid initially. By thus removing the strained out particles which tend to clog the screens, the straining unit is kept clean and adapted to operate at optimum efficiency at all times.

It will be apparent from the foregoing that the coarse particles are removed from the liquid by means which is usable over and over again and the burden imposed on the filtering unit 13 is reduced substantially this being accompanied by a corresponding reduction in the amount of paper, the only consumable element involved in the combined separating and filtering machine. Moreover, by nesting the strainer unit 13 within the filter unit 10, a minimum of floor space is required by the combined machine and in addition both units may be driven conveniently from a single power source.

I claim as my invention:

1. A combined separator and filter having, in combination, a horizontal power rotated shaft having a pair of axially spaced sprockets fast thereon, an inclined chute extending transversely of said shaft and having side walls straddling said sprockets and a flat bottom extending downwardly to a point below the sprockets and then upwardly so as to cooperate with said side walls in defining a receptacle for liquid to be clarified, a first endless conveyor meshing with said sprockets and having paddles thereon movable along the chute bottom to elevate and remove solids settling to the bottom of said receptacle, at least one of said side walls having an opening therein screened to permit liquid to gravitate from the receptacle, disks larger than said sprockets mounted to turn about the axis of said shaft and disposed on opposite sides of said chute, a second endless perforated conveyor spanning said disks below said receptacle and having an upper run contacting the lower arcuate portions of the disks, a sheet of flexible filter medium supported by said second conveyor and extending between the latter and the disks, said sheet cooperating with the disks to form a pocket for receiving the strained liquid flowing through said screened opening, a tank disposed below said conveyor to receive the liquid filtered through said sheet, and means for transmitting power from said shaft to said second conveyor to advance new areas of the sheet into filtering position.

2. A combined separator and filter having, in combination, a horizontal power rotated shaft having a pair of axially spaced sprockets fast thereon, an inclined chute extending transversely of said shaft and having side walls straddling said sprockets and a flat bottom extending downwardly and around said sprockets to define a liquid receptacle, a first endless conveyor meshing with said sprockets and having elements movable along the chute bottom to elevate and remove solids settling to the bottom of said receptacle, one wall of said receptacle having an opening therein, a screen covering said opening to strain the liquid flowing therethrough, disks larger than said sprockets mounted to turn about the axis of said shaft and disposed on opposite sides of said chute, a second endless perforated conveyor spanning said disks below said receptacle and having an upper run contacting the lower arcuate portions of the disks, a sheet of flexible filter medium supported by said second conveyor and extending between the latter and the disks, said sheet cooperating with the disks to form a pocket for receiving the liquid flowing from said opening, and a tank disposed below said conveyor to receive the liquid filtered through said sheet.

3. A combined separator and filter having, in combination, an elongated flexible filter sheet, means supporting said sheet to form a filter pocket and to advance the sheet endwise and bring fresh areas of the sheet into the pocket, an upwardly inclined chute defining at its lower end a receptacle disposed above said pocket and adapted to receive liquid to be filtered, said receptacle having an imperforate bottom and a screened opening in a side wall thereof, and a conveyor having elements movable along the bottom of said chute to remove from the receptacle material separated from the liquid and accumulating in the bottom of the latter.

4. A combined separator and filter having, in combination, an elongated flexible filter sheet, means supporting said sheet to form a filter pocket and to advance the sheet endwise and bring fresh areas of the sheet into the pocket, an upwardly inclined trough defining at its lower end a receptacle nested within said pocket below the edges of the side walls thereof and adapted to receive liquid to be filtered, said pocket and said receptacle having arcuate bottoms concentric with a common axis, a screened opening in a wall of said receptacle permitting liquid to gravitate from the latter into said pocket, and a conveyor having elements movable around the bottom of said chute in a path concentric with said axis whereby to remove from the receptacle material accumulating in the bottom of the latter.

5. A combined strainer and filter having, in combination, a horizontal power rotated shaft, an inclined chute extending transversely of said shaft having spaced side walls upstanding from a flat bottom which extends downwardly and then upwardly around the shaft to define a receptacle for liquid to be clarified, an endless conveyor driven from said shaft and having paddles movable along the chute bottom to elevate and remove material settling to the bottom of said receptacle, at least one of said side walls having an opening to permit liquid to gravitate from said receptacle, a perforated disk covering said opening and rotatable with said shaft to present different areas of the disk opposite the opening, and means for directing a stream of fluid toward said receptacle and through an area of said disk angularly spaced from said opening.

6. A combined strainer and filter having, in combination, an inclined chute defining at its lower end a receptacle for liquid to be clarified, a power rotated shaft extending horizontally into said receptacle, an endless conveyor driven from said shaft and operable to advance separated particles out of said receptacle and along said chute, a side wall of said receptacle having an opening therein, a perforated disk covering said opening and rotatable with said shaft to present different areas of the disk opposite the opening, and means disposed above said opening and operable to blow air through said disk whereby to remove particles retained on the disk after passing said opening.

7. A combined strainer and filter having, in combination, a pair of axially spaced sprockets rotatable about a horizontal axis, an inclined chute extending transversely of said axis and having side walls straddling said sprockets and a bottom extending downwardly to a point below the sprockets and then upwardly so as to cooperate with said side walls in defining a receptacle for liquid to be clarified, an endless power driven conveyor meshing with said sprockets and having paddles thereon movable along the chute bottom and around said axis to elevate and remove solids settling to the bottom of said receptacle, a wall of said receptacle having an opening therein screened to permit liquid to gravitate from the receptacle, disks larger than said sprockets mounted to turn about said axis and disposed on opposite sides of said chute, and a flexible filter sheet spanning said disks below said receptacle and contacting the lower arcuate portions of the disks to form therewith a pocket for receiving the strained liquid flowing through said screened opening.

8. A combined separator and filter having, in combination, a horizontal power rotated shaft carrying a pair of axially spaced sprockets thereon, an inclined chute extending transversely of said shaft and having side walls straddling said sprockets and a bottom extending downwardly and around said sprockets to define a liquid receptacle, a first endless conveyor meshing with said sprockets and having elements movable along the chute bottom to elevate and remove solids settling to the bottom of said receptacle, one wall of said receptacle having an outlet for the escape of liquid therefrom, disks larger than said sprockets mounted to turn about the axis of said shaft and disposed on opposite sides of said chute, a sheet of flexible filter medium spanning said disks below said receptacle, means cooperating with said disks to support said sheet for endwise movement during turning of said disks, said sheet cooperating with the disks to form a pocket for receiving the liquid flowing from said outlet, and a tank disposed below said conveyor to receive the liquid filtered through said sheet.

References Cited in the file of this patent

UNITED STATES PATENTS

| | | |
|---|---|---|
| 794,631 | Milne | July 11, 1905 |
| 1,769,655 | Stehling | July 1, 1930 |
| 1,826,361 | McNeal | Oct. 6, 1931 |
| 2,458,139 | Boucher | Jan. 4, 1949 |
| 2,650,710 | Stebling | Sept. 1, 1953 |
| 2,664,203 | Crane et al. | Dec. 29, 1953 |
| 2,720,973 | Gross | Oct. 18, 1955 |